United States Patent [19]

Sharma et al.

[11] 4,089,931

[45] May 16, 1978

[54] PURIFICATION OF BORON NITRIDE

[75] Inventors: Ram A. Sharma, Sterling Heights; Thompson G. Bradley, Rochester, both of Mich.

[73] Assignee: General Motors Corporation, Detroit, Mich.

[21] Appl. No.: 817,926

[22] Filed: Jul. 22, 1977

[51] Int. Cl.$^2$ .............................................. C01B 21/06
[52] U.S. Cl. .................................... 423/290; 423/292; 106/55; 264/82; 264/101
[58] Field of Search .................. 423/290, 292; 106/55; 429/102; 264/82, 101

[56] References Cited

U.S. PATENT DOCUMENTS

| 3,887,687 | 6/1975 | Buford | 423/292 |
| 3,915,742 | 10/1975 | Battles et al. | 429/102 |

FOREIGN PATENT DOCUMENTS

| 625,813 | 6/1965 | Belgium | 423/290 |

*Primary Examiner*—G. O. Peters
*Attorney, Agent, or Firm*—Lawrence B. Plant

[57] ABSTRACT

Boron nitride (BN) is freed of boric oxide without increasing its electroconductivity by heating the BN under vacuum to evaporate the boric oxide and chlorinating the BN at a temperature sufficient to remove any elemental boron as boron trichloride.

3 Claims, No Drawings

PURIFICATION OF BORON NITRIDE

BACKGROUND OF THE INVENTION

This invention relates to the ultra-purification of boron nitride to increase its useful life in alkali metal/fused salt electrochemical cells and particularly in the less reactive alloyed-lithium cells.

Boron nitride (BN) has use as an insulator and/or separator material in alkali metal-fused salt electrochemical cells. Battles et al U.S. Pat. No. 3,915,742 discloses the need to free BN from any boric oxide therein to prevent degradation of the BN separator/insulator by the alkali metal in such cells. Others have proposed to remove the $B_2O_3$ by heating the BN to drive off the $B_2O_3$, and Battles et al performs the heating in a dry, flowing nitrogen atmosphere to suppress BN decomposition at the $B_2O_3$-freeing temperature and has apparently achieved boric oxide contents of as low as 0.3 weight percent and as much as 1390 hours of useful life as a separator in a Li-Al/LiCl-KCl/FeS$_2$ cell. The nitrogen pressure, however, retards more complete removal of the $B_2O_3$ and, if any $O_2$ or moisture at all is present, allows the risk of forming $B_2O_3$ from the BN rather than removing it.

It is an object of the present invention to provide a process for the ultra-purification of BN to not only substantially increase its useful life in lithium-alloy fused salt cells, but also to render it more long-lived in pure alkali metal/fused salt cells.

THE INVENTION

According to the process of the present invention, $B_2O_3$-containing BN is heated in a vacuum at a temperature and for a time sufficient to substantially evaporate substantially all of the boric oxide ($B_2O_3$), and then to chlorinate the BN at a temperature sufficient to chlorinate, and volatize as $BCl_3$, any elemental boron formed during the vacuum treatment.

In order to achieve the maximum flight of the $B_2O_3$ from the BN, the heat treatment is conducted at an absolute pressure which is less than the equilibrium vapor pressure of the $B_2O_3$ at the treatment temperature. To achieve the maximum $B_2O_3$ removal rate the temperature used should be as high as reasonably possible, and the absolute pressure (i.e., vacuum) considerably less than the $B_2O_3$ vapor pressure. High temperatures and vacuums, however, tend to decompose some of the boron nitride and leave a film of elemental boron on and within the boron nitride which substantially increases its electroconductivity and negates its usefulness as an electrochemical cell insulator/separator. According to the present invention, the insulative character of the thusly treated boron nitride is regained by chlorinating the elemental boron to form boron trichloride and evaporating if off from the boron nitride.

The equilibrium vapor pressure for $B_2O_3$ in the temperature range 1331° K. to 1808° K. is given in the table and indicates the minimum vacuum required to remove the $B_2O_3$ at any given temperature. While this invention is considered effective over that entire range, I prefer to remove the $B_2O_3$ at a temperature of about 1775° K. to about 1825° K. and absolute pressure of about 0.1 kilopascals (kPa) to effect relatively rapid removal of the $B_2O_3$, which will also depend on the size, shape and structure (e.g., solid, cloth, etc.) of the BN part.

| EQUILIBRIUM VAPOR PRESSURES OF $B_2O_3$ | | | |
|---|---|---|---|
| Temp. K | Vap. Press. kPa | Temp. K | Vap. Press. kPa |
| 1331 | $7.84 \times 10^{-5}$ | 1540 | $6.62 \times 10^{-3}$ |
| 1350 | $1.91 \times 10^{-4}$ | 1550 | $7.46 \times 10^{-3}$ |
| 1369 | $2.49 \times 10^{-4}$ | 1569 | $7.31 \times 10^{-3}$ |
| 1380 | $5.09 \times 10^{-4}$ | 1631 | $2.34 \times 10^{-2}$ |
| 1390 | $4.05 \times 10^{-4}$ | 1642 | $2.91 \times 10^{-2}$ |
| 1449 | $1.00 \times 10^{-3}$ | 1567 | $3.65 \times 10^{-2}$ |
| 1476 | $1.61 \times 10^{-3}$ | 1579 | $3.14 \times 10^{-2}$ |
| 1490 | $2.28 \times 10^{-3}$ | 1772 | 0.415 |
| 1497 | $2.91 \times 10^{-3}$ | 1806 | 0.355 |
| 1510 | $4.31 \times 10^{-3}$ | 1808 | 0.263 |

While the effect of the vacuum heat treatment is to remove substantially all of the $B_2O_3$, it also encourages the decomposition of the boron nitride and the formation of elemental boron throughout the boron nitride which in turn increases its electrical conductivity. According to Applicant's invention, this boron nitride decomposition is tolerated in order to achieve the greater boric oxide removal, and the elemental boron is then removed by heating boron nitride in chlorine to a temperature sufficient to form boron trichloride and cause it to evaporate from the boron nitride. The chlorination temperature is not particularly critical, but is limited rather only by the practical considerations of the time it would require to remove the boron impurities. In this regard, boron trichloride will form at room temperature and will boil above about 291° K. Higher temperatures, however, accelerate the boron removal and insure a more complete removal. We prefer to chlorinate in the temperature range of about 600°–800° K. which is well above the boiling point of the boron trichloride, but short of a temperature at which the boron nitride degrades in the presence of chlorine.

As an indication of the purification achieved by this invention, several tests were performed with both BN cloth and solid samples. The BN cloth was about 2 mm thick with a twill weave and had a supplier-reported oxygen content of about 2.5% by weight. The BN solid was about 90% of the theoretical density of BN and had supplier reported oxygen content of less than about one percent by weight. The samples were purified by heating slowly to about 1800° K. at an absolute pressure of 0.1 kPa. The cloth samples were maintained at this temperature and pressure for about 14.5 kiloseconds (ks), while the solid samples were treated for about 260 ks to insure substantially complete removal of the $B_2O_3$. Thereafter, the samples were treated with chlorine at about 800° K. for 7 ks to remove any elemental boron impurities developed during the previous vacuum heat treatment. Some cloth samples were stored in a helium-atmosphere dry box and later assembled into several evaluation test cells described hereafter. Others, along with the solid BN, were subjected to static-immersion tests described hereafter.

CELL TESTS

In one test cell, a lithium electrode was made using coiled, hydrogen-fired, 120 mesh nickel screen as a matrix. The matrix was attached to a nickel rod and impregnated with lithium (99.97% pure) by dipping into a molten pool thereof held at 973° K. followed by cooling to room temperature. Other lithium electrodes were similarly made but used a fibrous nickel (i.e., 60% porosity FELTMETAL ®) as the Li-wetted matrix.

For another test cell, lithium-silicon (i.e., Li$_2$Si) electrodes were prepared by heating about 50 g of lithium (99.97% pure) to about 775° K. in a clean nickel cup and slowly adding a calculated amount of coarse silicon thereto. The molten lithium soaked into the silicon powder, an exothermic reaction was observed, and a solid mass formed at the surface of the melt. The temperature was then slowly raised to 1075° K., and the solid mass dissolved into the melt and was homogenized therewith by stirring followed by cooling to room temperature and powdering to about 60-100 mesh. The powder was vibration loaded into a container made from a 6 mm long piece of 304-stainless steel tubing (i.e., 25 mm ID and 28 mm OD) and containing a 90% porous nickel current collector. The loaded container was then closed by spot-welding a double layer of 304-stainless steel screen (i.e., 400 mesh and 150 mesh) over both ends.

For still another test cell, lithium-aluminum electrodes were prepared from discs of −30 mesh aluminum (99.9% pure) screen enclosed in a cylindrical stainless steel container. These electrodes were electrochemically loaded with lithium to 55 atomic percent lithium in the manner described by Dunning, Bradley and Zeitner, Proc. 1976 IECEC, 11, p. 491 (1976).

All cell and static-immersion tests were performed using an eutectic mixture melt of lithium chloride (99.6% purity) and potassium chloride (99.9% purity) further purified by bubbling chlorine therethrough at about 723° K. for about 14.5 ks and subsequently scavenging the chlorine by bubbling helium therethrough for about 3.6 ks. The test cells, containing about 250 g of eutectic, were heated in a tubular furnace in a helium atmosphere dry box and had their temperature regulated by a proportional controller and monitored by chromelalumel thermocouples in conjunction with a potentiometer. A d-c power supply together with the necessary logic and switching circuitry to cycle the cell automatically according to a preset charge-discharge program were used to test the cells and a dual-channel recorder was used to measure cell potential and current.

In test cells 1 and 2, the lithium impregnated nickel screen was used as the negative electrodes, the Li-Al electrodes alloy as the positive electrodes, and the BN cloth as a separator between the electrodes. In cell No. 1 the cloth was used as-received from the supplier whereas in cell No. 2 (and all other cells) the cloth was heat treated and chlorinated as above. The BN cloths in these tests were prewetted with the LiCl-KCl electrolyte (i.e., out of contact with the lithium electrode) by soaking them for about 7.2 ks in the electrolyte at about 775° K., after which time the temperature was lowered to the cell operating temperature (i.e., 690° K.) and the lithium electrodes brought into contact with the cloth. Cell No. 1 was cycled regularly whereas cell No. 2 was cycled only occasionally and held at open circuit for most of the test.

For cells 3, 4 and 5, the BN separators were submerged in the molten electrolyte under vacuum for about 7.2 ks before being assembled with the electrodes into the cells and cycled at 700° K. Cell No. 3 had Li and Li-Al electrodes like cells No. 1 and No. 2 while cells No. 4 and No. 5 had lithium filled porous nickel matrices serving as both the positive and negative electrodes.

Test cell No. 6 had two of the aforesaid lithium-silicon electrodes with the BN cloth separator sandwiched therebetween. The electrode-separator sandwich was submerged in the electrolyte at 750° K. for about 2 ks to allow for temperature equilibration and electrolyte penetration into the separator before cycling began. Cycling commenced at a current density of 20 ma/cm$^2$ and was gradually increased to 100 ma/cm$^2$, and was maintained at this level for the duration of the test during which time the electrodes were alternately charged to $Li_{15}Si_4$.

Test cell No. 7 has a central $FeS_2$ positive electrode (i.e., $FeS_2$ powder held in Mo. mesh) flanked by two Li-Al (i.e., 55 atomic percent Li) negative electrodes like that disclosed in copending application, Sharma et al USSN 787,875 filed Apr. 15, 1977.

Following short circuiting of each cell an autopsy was performed to determine the failure mode and the condition of the separator. Cells 1, 2, 3 and 4 survived 2.1 Ms (i.e., mega seconds), 0.5 Ms, 1.7 Ms and 0.7 Ms, respectively. The boron nitride cloth separators used in cells 1-4 were observed to be darkened but otherwise structurally intact at the end of the tests. The apparent short circuiting mode was due to the presence of very fine droplets of lithium distributed throughout the electrolyte-impregnated cloth, rather than to a continuous lithium film on the boron nitride as would be expected if the BN had been preferentially wetted by the electrolyte. Hence, it was concluded that the relatively short lives of cells 1-4 were more likely due to the malfunctioning of the lithium electrodes rather than the deterioration of the boron nitride cloth separator by chemical attack.

In test No. 5, the two lithium electrodes behaved satisfactorily during normal cycling for 5.58 Ms. Thereafter, and for the last 5.22 Ms of a total 10.8 Ms test, the lithium electrodes caused problems and the cell was cycled only occasionally. The autopsy on this cell indicated that the weave of the BN cloth had opened slightly around the edges. The cloth was darkened and appeared to be less fibrous, but otherwise had maintained its structural integrity and original thickness. When a small piece of this BN cloth was dipped in water a reaction occurred forming ammonia and leaving a white fibrous mass. When two pieces of the fresh BN cloth (i.e., one electrolyte-free and one impregnated with electrolyte) were also dipped in water no ammonia was detected. The ammonia evolution from the cell No. 5 BN cloth indicated that $Li_3N$ had been formed in the cell from some of the BN. This reaction likely caused the partial destruction or breaking of original long fibers into the shorter ones observed.

Test cell No. 6 lasted for 10.8 Ms and the BN cloth thereof remained intact without degradation though it became less flexible and developed a crusty deposit on some areas.

Test cell No. 7 lasted for 37.5 Ms under constant cycling at 750° K. A small piece of the BN separator of this cell was freed from the cell materials by washing gently with methanol and water solutions, and did not appear to be deteriorated in any respect likely due to the lower activity of the alloyed lithium.

STATIC-IMMERSION TESTS

Two pieces of the solid and two pieces of the BN cloth were subjected to a static-immersion test in a sealed hydrogen-fired stainless steel capsule containing 80 gs of LiCl-KCl eutectic having 2 gs of lithium therein. The capsule was heated to 675° K. and kept at this temperature for 18 Ms. At the end of this period, the melt was drained off and the BN samples studied.

These solid and cloth BN samples developed a black color, and the solid pieces became struck together by a metal-like substance such that they could not be separated by dipping them into the LiCl-KCl melt and applying a gentle force. The solid samples had no apparent structural degradation and their unit weight appeared to increase by roughly 30%. Still further, the solid pieces were found floating over the melt whose density at test conditions was about 1.68 g/cm$^3$ in contrast to a pretest solid BN density of about 2.0 g/cm$^3$. Two more pieces of the solid BN were left in air and observed under a microscope. A reaction with the air (i.e., probably moisture) started on the surface perpendicular to the fractured surface rather than on the fractured surface and the reaction products were solid black masses. Still further, small pieces of the solid and cloth were treated separately with methanol and were observed to react therewith to evolve a gas and leave a grayish-black suspension. In a similar test with water, ammonia was evolved and a black suspension left.

A SEM photograph of a fractured surface of a cloth sample showed that the fibers had reacted and had degenerated into very fine fibers indicated by a hairy appearance. A SEM photograph of a fractured surface of a solid sample showed the presence of solidified LiCl-KCl melt, and confirmed that the LiCl-KCl is not replaced by lithium as a result of the preferential wetting of the BN by lithium. Another SEM photograph of a fractured surface of a solid sample indicated that the reaction proceeded nonuniformly at different locations of the sample and suggested, by the presence of different structures, that at least two possible BN phases exist.

Chemical analysis of the solid BN samples showed 25-38 percent by weight lithium which cannot be accounted for by mere LiCl-KCl melt penetration alone, and the variation of the lithium content in the sample reinforces the SEM indicated observations concerning the nonuniformity of the reaction. Lastly, x-ray diffraction analysis of the samples indicated the presence of boron nitride and Li$_3$N but not elemental boron.

All of these tests indicate that boron nitride is attacked by a lithium-containing LiCl-KCl melt at about 675° K., and that the attack proceeds most likely by reaction between the BN and the lithium in the possible formation of lithium boride but that this reaction does not destroy the structural integrity of the BN.

It is noted that the samples tested in the sealed capsule for 18.0 Ms at 675° K. were under a pressure of more than two atmospheres which in addition to the time element, may help explain why they were attacked more than the samples tested in cell No. 5 for 10.8 Ms at 690° K. and about one atmosphere.

In another test, BN cloth was kept forcibly submerged in LiCl-KCl melt for 65 ks at about 775° K. At the end of this time not only was it not impregnated with the LiCl-KCl but rather it floated on the LiCl-KCl. On the other hand, the same cloth became impregnated when it was forcibly submerged in the LiCl-KCl and subjected to a vacuum for 600 s at about 775° K. Another cloth sample became impregnated within 2 ks when submerged in 775° K. LiCl-KCl while in contact with lithium. In still another test, BN cloth was impregnated with LiCl-KCl melt and then placed and kept in contact with lithium and LiCl-KCl in a cup at 675° K. for 65 ks during which time the lithium did not replace the LiCl-KCl melt in the cloth.

These tests show that the process of the present invention can produce substantially B$_2$O$_3$-free BN having high insulative values capable of prolonged useful life in alloyed-lithium electrochemical cells where the lithium reactivity is less than that of pure lithium. These tests further show that ultra-pure BN produced by this process can survive even the pure lithium cell environment without deterioration due to the presence of B$_2$O$_3$, but that such cells have life spans determined only by the extent to which Li$_3$N is formed.

While this invention has been disclosed primarily in terms and specific embodiments thereof, it is not intended to be limited thereto, but rather only to the extent set forth in the claims which follow.

The embodiments of the invention in which an exclusive property or privilege is claimed are defined as follows:

1. A process for purifying boron nitride to remove boric oxide therefrom without increasing the electrical conductivity of the boron nitride comprising the steps of:
    heating the boron nitride in a vacuum for a sufficient time and at a sufficient temperature to evaporate said boric oxide; and thereafter
    exposing the boron nitride to chlorine to chlorinate any elemental boron formed during said evaporation and drive it off as boron trichloride.

2. A process for removing boric oxide from boron nitride without increasing the electrical conductivity of the boron nitride comprising the steps of:
    heating the boron nitride in a vacuum to a temperature of about 1331° K. for a period sufficient to evaporate substantially all of said B$_2$O$_3$, the absolute pressure of said vacuum being less than the equilibrium vapor pressure of the B$_2$O$_3$ at the specific temperature chosen; and thereafter
    heating the boron nitride in the presence of chlorine to chlorinate any elemental boron formed during said evaporation and drive it off as boron trichloride.

3. A process for purifying boron nitride to remove boric oxide therefrom without increasing the electrical conductivity of the boron nitride comprising the steps of:
    heating the boron nitride to a temperature of about 1775° K. to 1825° K. and at an absolute pressure of less than about 0.1 kPa for a time sufficient to evaporate substantially all of said B$_2$O$_3$ therefrom; and thereafter
    heating the boron nitride to about 600° K. to about 800° K. in the presence of chlorine to chlorinate any boron formed during said B$_2$O$_3$ evaporation step and drive it off as boron trichloride.

* * * * *